United States Patent [19]

Saito

[11] Patent Number: 4,739,355
[45] Date of Patent: Apr. 19, 1988

[54] FOCAL PLANE SHUTTER

[75] Inventor: Toshihisa Saito, Tokyo, Japan

[73] Assignee: Copal Company Limited, Tokyo, Japan

[21] Appl. No.: 96,943

[22] Filed: Sep. 15, 1987

[30] Foreign Application Priority Data

Sep. 20, 1986 [JP] Japan .............................. 61-144637[U]
Sep. 30, 1986 [JP] Japan .................................. 61-149762

[51] Int. Cl.⁴ ............................................... G03B 9/40
[52] U.S. Cl. ..................... 354/246; 354/251; 354/252
[58] Field of Search .............. 354/246, 247, 248, 249, 354/251, 252

[56] References Cited

U.S. PATENT DOCUMENTS

| | | | |
|---|---|---|---|
| 3,825,940 | 7/1974 | Hayami | 354/251 |
| 4,109,266 | 8/1978 | Inoue | 354/246 |
| 4,245,905 | 1/1981 | Takayama | 354/246 |
| 4,302,091 | 11/1981 | Harase et al. | 354/246 |

FOREIGN PATENT DOCUMENTS 62-9241  1/1987  Japan .

Primary Examiner—A. A. Mathews
Attorney, Agent, or Firm—Spensley Horn Jubas & Lubitz

[57] ABSTRACT

In order to enable to obtain stable exposure time even for successive photographing at high speeds and completely synchronize flashing without errors, the focal plane shutter comprising a front blade group and a rear blade group is adapted in such a manner that the rear blade group is returned to its start position (folded position) substantially at the final stage of the shutter cocking travel, a retaining lever for locking the rear balde group at the unfolded position (position covering the exposure aperture) during the shutter cocking operation functions as a brake member for the rear blade operating lever, and said focal plane shutter is equipped with a movable X-contact lever which is retained at a position apart from a fixed contact by a front blade actuating arm during and after the shutter cocking operation and maintained at a position apart from the fixed contact by an X-contact release lever operated by the rear blade operating lever for the time from completion of the exposure operation to completion of the former half of the shutter cocking travel.

4 Claims, 3 Drawing Sheets

FOCAL PLANE SHUTTER

BACKGROUND OF THE INVENTION (a) Field of the Invention

The present invention relates to a focal plane shutter of a type wherein said shutter is equipped with a front blade group and a rear blade group, and said rear blade group is returned to the start position (folded position) at the substantially final stage of the shutter cocking travel.

(b) Description of the Prior Art

In general focal plane shutters equipped with a front blade group and a rear blade group, the front and rear blade groups are brought to a position covering an exposure aperture (unfolded position) and a position not covering the exposure aperture (folded position) respectively when the shutter is to be cocked. During this cocking travel, the rear blade group must travel across the exposure aperture while keeping a required overlapped condition in order to prevent light leakage. The conventional focal plane shutter of a type so adapted as to perform the shutter cocking travel with a cam mechanism can satisfy this requirement by adopting a suitable cam shape design. However, in the focal plane shutter of the type, for example, proposed by Japanese Utility Model Preliminary Publication No. Sho 62-9241 wherein the shutter cocking travel is performed by use of rollers pivoted to a front blade actuating arm, a rear blade actuating arm and shutter cocking member respectively, a clearance may be formed between the front and rear blade groups at an ordinary cocking travel distance when the shutter has been cocked. Therefore, said type of focal plane shutter adopts a composition wherein a rear blade operating member in addition to said rear blade actuating arm to prevent the rear blade group from returning or moving to the position not covering the exposure aperture (folded position) until the shutter cocking operation completes or the front blade group reaches the position completely covering the exposure aperture (unfolded position) by locking said rear blade operating member, and when the front blade group reaches the position completely covering the exposure aperture, the rear blade operating member is unlocked by the rear blade operating member and allowed to move speedly to the start position (folded position).

In the latter type of focal plane shutter, however, wherein the rear blade group has a relatively long travel from its start to stop after completing the shutter cocking operation, the rear blade group travels with inertia and bounds rather severely at its stop position. Therefore, the focal plane shutter of this type has a drawback that the bound makes exposure time unstable or causes hindrance in successive photographing.

Further, in the focal plane shutter of said type wherein the front and rear blade groups are brought to the unfolded position and folded position respectively when the shutter is to be cocked, it is general to release the movable contact member from the fixed contact in synchronization with the operation of the rear blade locking lever or rear blade actuating lever between the movable contact member for synchroflashing and the fixed contact. The focal plane shutter having this composition allows a trouble of erroneous flashing due to accidental contact between the movable contact member and fixed contact unless sufficient consideration is taken to assure proper synchronization between the cocking travel of the front blade actuating lever and the rear blade locking lever or rear blade actuating lever for the shutter cocking operation.

SUMMARY OF THE INVENTION

A primary object of the present invention is to provide a focal plane shutter of said latter type free from the drawbacks described above.

Another object of the present invention is to provide a focal plane shutter of said latter type capable of assuring a very stable high-speed exposure.

A third object of the present invention is to provide a focal plane shutter of said latter type incorporating a synchro-contact device capable of always performing accurate synchroflashing without error.

The focal plane shutter according to the present invention is adapted in such a manner that a retaining lever for locking the rear blade group at the unfolded position (position covering the exposure aperture) during the shutter cocking operation is so designed as to serve also as a brake member for the rear blade operating lever, and the rear blade group is returned to its start position at a low speed after the shutter has been cocked. Accordingly, the motion of the rear blade group is substantially free from inertia during the returning travel and its bound is limited within a negligible range.

Further, in the focal plane shutter according to the present invention, the front blade actuating arm locks the movable contact member at a position apart from the fixed contact during the shutter cocking operation and after the shutter has been cocked, the movable contact member is unlocked from the front blade actuating arm and brought into contact with the fixed contact when an exposure is to be started, thereafter the rear blade operating lever retains the movable contact member at a position apart from the fixed contact by way of a movable contact releasing member, and retaining of the movable contact member by the movable contact release member is released at the latter half stage of the shutter cocking travel.

These and other objects of as well as the features and advantages of the present invention will be apparent from the following detailed description of the preferred embodiment when taken in conjunction with the accompanying drawings.

DESCRIPTION OF THE PREFERRED EMBODIMENTS

Figure 1:
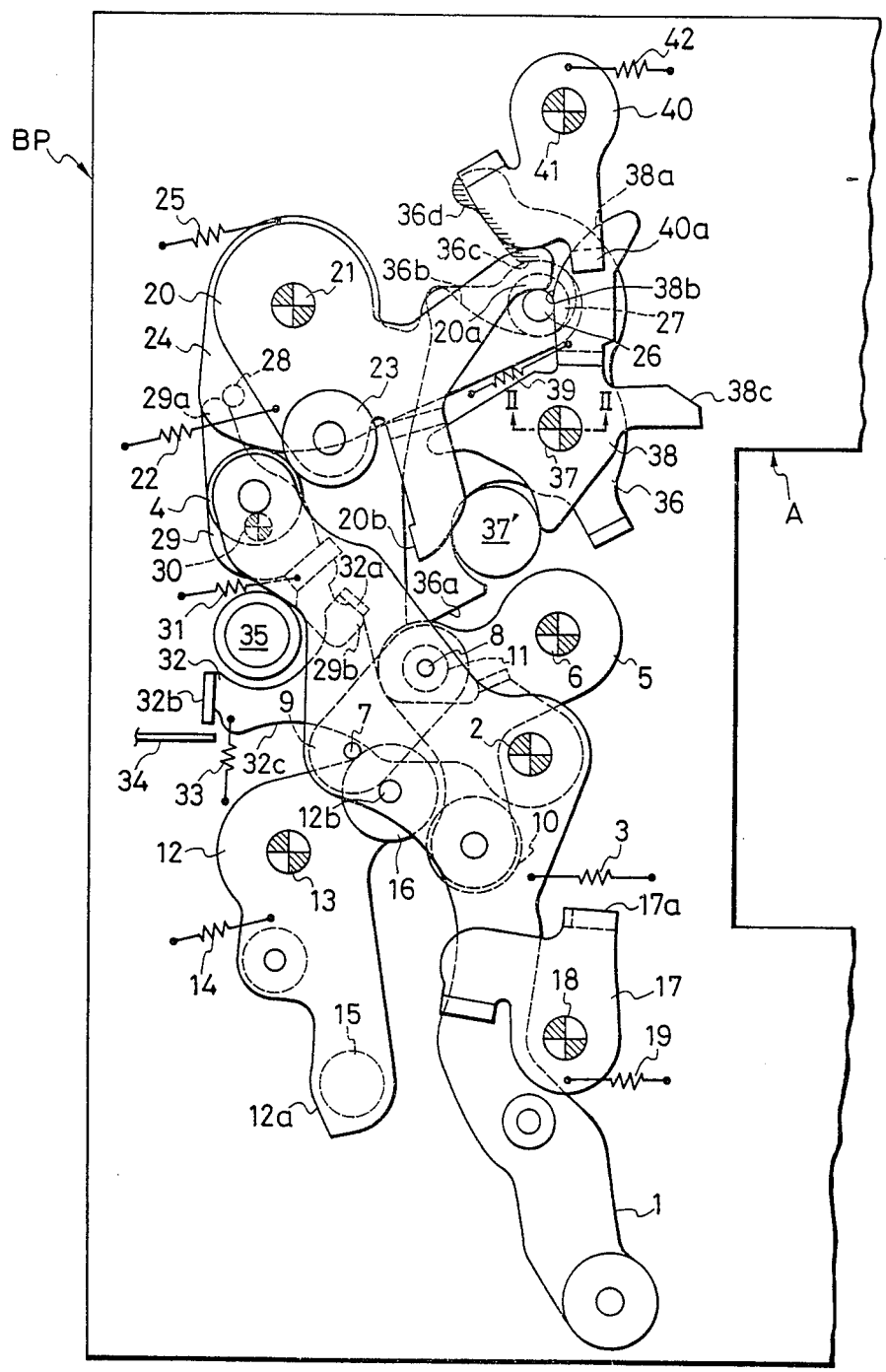
FIG. 1 is a plan view of the main parts illustrating the uncocked state of an embodiment of the focal plane shutter according to the present invention.

Now, an embodiment of the focal plane shutter according to the present invention will be described with reference to the accompanying drawings. All the component parts described below are arranged on a base plate BP having an exposure aperture, and each component part tensed by a tension spring is kept stationary at the position shown in FIG. 1 with a corresponding stopper or pin provided on the base plate BP.

In the accompanying drawings, the reference numeral 1 represents a main cocking lever composing a cocking member in combination with an auxiliary cocking lever described later, pivoted freely rotatably by a shaft 2, biased counterclockwise by a spring 3, and arranged freely rotatably while kept between the position shown in FIG. 1 and that shown in FIG. 2 by a pair of stoppers (only one stopper is shown). The reference numeral 4 designates a roller which is pivoted by a shaft on the main cocking lever 1 and engageable with a roller of a rear blade actuating arm described later. The reference numeral 5 denotes an auxiliary cocking lever which is pivoted by a shaft 6, connected to the main cocking lever 1 by connecting pivots 7 and 8 through a connecting lever 9, and rotates in conjunction with rotation of the main cocking lever 1. The reference numeral 10 represents a roller pivoted on the auxiliary cocking lever 5 and engageable with a roller on the front blade actuating arm described later. The reference numeral 11 designates a roller pivoted by the connecting pivot 8 and engageable with a rear blade locking member described later.

The reference numeral 12 denotes a front blade actuating arm which is pivoted around a shaft 13, biased clockwise and engaged with a stopper (not shown) so as not to rotate further clockwise in the uncocked state illustrated in FIG. 1. The reference numeral 12a represents a locked portion formed on the front blade actuating arm 12 and engaged with a locking lever described later in the cocked state of the front blade actuating arm 12. The reference numeral 15 designates a pin which is studded on the front blade actuating arm 12 and functions to actuate the front blade group (not shown) by way of the front blade operating arm (not shown): the front blade actuating arm 12 being shown in FIG. 1 at a position to set the front blade group so as to keep the exposure aperture A in its open state (folded position). The reference numeral 16 denotes a roller which is pivoted by a shaft 12b on the front blade actuating arm 12 and engageable with the roller 10. The reference numeral 17 represents a front blade locking lever which is pivoted by a shaft 18, biased counterclockwise by a spring 19 and retained to prevent further counterclockwise rotation by a stopper (not shown) in the state illustrated in FIG. 1. The reference numeral 17a designates a locking portion formed on the front blade locking lever 17 for locking the locked portion 12a of the front blade actuating arm.

The reference numeral 20 denotes a rear blade actuating arm which is pivoted by a shaft 21, biased clockwise by a spring 22, equipped with an operating portion 20a for actuating a rear blade operating lever described later and a locked portion 20b to be locked by a rear blade locking lever described later, and pivots a roller 23 engageable with the roller 4 on the main cocking lever 1. The reference numeral 24 represents a rear blade operating lever which is pivoted by the shaft 21, biased counterclockwise by a spring 25, and equipped with a small-diameter pin 26 to be engaged with the operating portion 20a of the rear blade actuating arm 20, a coaxial large-diameter pin 27 engageable with a retaining lever described later and a pin 28 to be engaged with an X-contact release lever described later. The spring 22 for biasing the rear blade actuating arm 20 is so set as to have a force larger than that of the spring 25 for biasing the rear blade operating lever 24. Accordingly, in the uncocked state illustrated in FIG. 1, the operating portion 20a presses the pin 26 to rotate the rear blade operating lever 24 to the limit clockwise position, and the rear blade operating lever 24 is kept in contact with a stopper (not shown) to prevent further clockwise rotation. The pin 27 on the rear blade operating lever 24 is so designed as to actuate the rear blade group (not shown) by way of the rear blade operating arm (not shown), and the rear blade group closes the exposure aperture A of the focal plane shutter in the state illustrated in FIG. 1.

The reference numeral 29 represents an X-contact release lever pivoted by a shaft 30, biased clockwise by a spring 31, and equipped with an engaging portion 29a engageable with the pin 28 on the rear blade operating lever 24 and an engaging portion 29b engageable with an X-contact lever described later. In the state illustrated in FIG. 1, the engaging portion 29a is kept in contact with the pin 28 to prevent the X-contact release lever from rotating further clockwise. The reference numeral 32 represents an X-contact lever which is pivoted by the shaft 2, biased counterclockwise by a spring 33, and equipped with an engaging portion 32a engageable with the engaging portion 29b of the X-contact release lever 29, a contact portion (movable contact) 32b contactable with a contact piece 34 on an X-contact device fixed on the base plate BP and a side surface 32c engageable with the shaft 12b. The reference numeral 35 designates said stopper pin having a large-diameter portion and a small-diameter portion, the former serving to prevent the main cocking lever 1 from rotating counterclockwise and the latter serving to prevent the X-contact release lever 29 from rotating clockwise.

Figure 3:
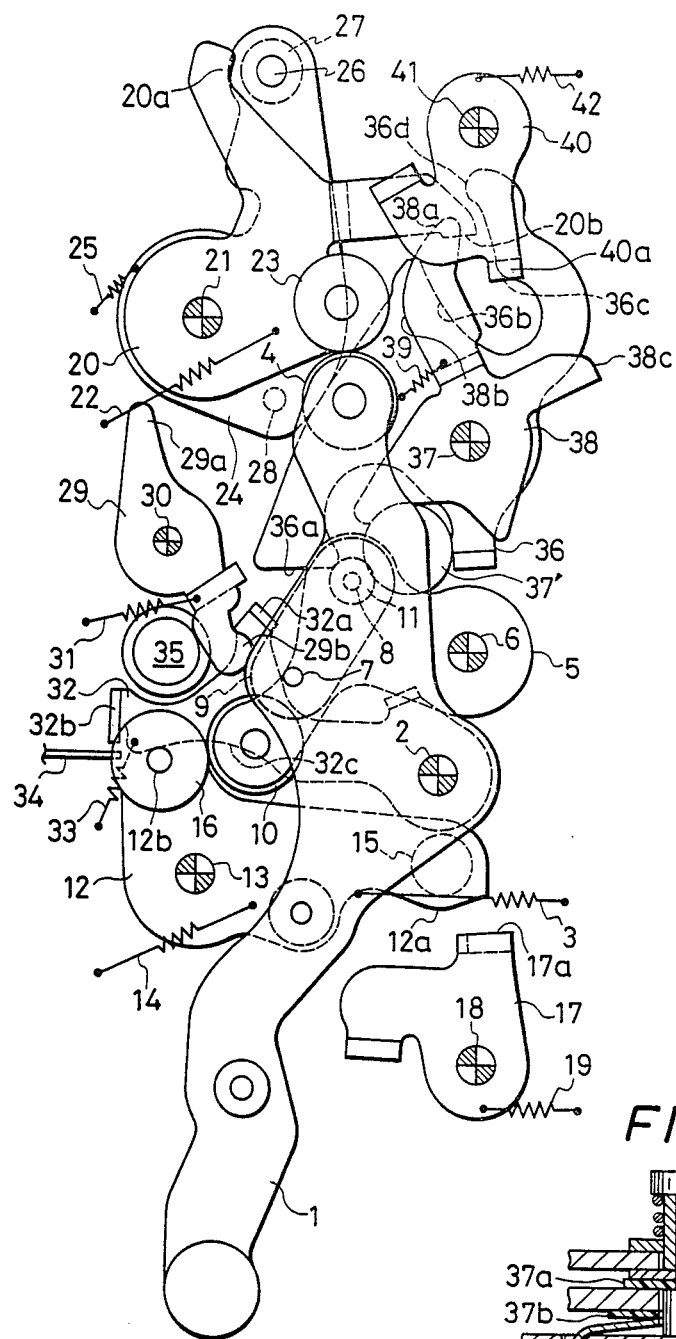
FIG. 3 is a plan view of the main parts illustrating a state in the course of the cocking travel of said embodiment.
Figure 2:
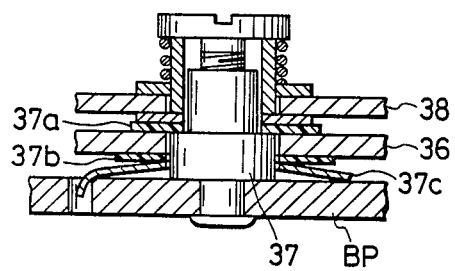
FIG. 2 is a partial sectional view taken along the II—II line in FIG. 1 and shown on an expanded scale.

The reference numeral 36 denotes a retaining lever which is pivoted by a shaft 37 while being sandwiched between synthetic resin washers 37a and 37b as shown in FIG. 2, pressed upward by a leaf spring 37c held between the base plate BP and the washer 37b so as to assure a suitable degree of frictional force on the washer 37b, and equipped with a pressed portion 36a engageable with the roller 11 pivoted by the connecting pivot 8, a side surface 36b engageable with the large-diameter pin 27 on the rear blade operating lever 24, a lock portion 36c and a cam surface 36d continuous thereto for restricting returning timing of the rear blade group. The retaining lever 36 is limited by a stopper pin 37' so as to be rotatable only between the position shown in FIG. 1 and that shown in FIG. 3 or FIG. 4. The reference numeral 38 represents a mirror returning lever pivoted by a shaft 37 freely rotatably over the retaining lever 36, and equipped with a side surfaces 38a and 38b contactable with the small-diameter pin 26 on the rear blade operating lever 24, and an arm 38c for returning a mirror (not shown). Arranged between the retaining lever 36 and the mirror returning lever 38 is a spring 39 for pulling these levers toward each other. Therefore, in the state illustrated in FIG. 1, the small-diameter pin 26 is kept in a condition that it is sandwiched between the operating portion 20a of the rear blade actuating arm 20 and the side surface 38b of the mirror returning lever 38. In addition, the mirror returning lever 38 is prevented from rotating counterclockwise by the stopper pin 37'.

The reference numeral 40 represents a rear blade locking lever which is pivoted by a shaft 41, biased clockwise by a spring 41 and kept in contact with a stopper (not shown) to prevent from rotating further clockwise in the state illustrated in FIG. 1. The reference numeral 40a designates a lock portion formed on the rear blade locking lever for locking the locked portion 20b of the rear blade actuating arm 20.

Now, operations of the focal plane shutter according to the present invention will be described. When the main cocking lever 1 is rotated clockwise in the uncocked state (immediately after completing photographing) shown in FIG. 1 to the position shown in FIG. 3, the auxiliary cocking lever 5 is also rotated clockwise by way of the connecting lever 9. By the clockwise rotations of these cocking levers 1 and 5, the roller 4 of the main cocking lever 20 and the roller 10 of the auxiliary cocking lever are brought into contact with the roller 23 of the rear blade actuating arm 20 and the roller 16 of the front blade actuating arm 12 respectively, whereby the front blade actuating arm 12 is rotated counterclockwise while giving tension to the spring 14 to move the front blade group (not shown) from the position keeping the exposure aperture A open to the position to close the exposure aperture A, and the rear blade actuating arm 20 is rotated counterclockwise while giving tension to the spring 22. During this operation, though the rear blade operating lever 24 slightly follows the counterclockwise rotation of the rear blade actuating arm, the large-diameter pin 27 engages with the lock portion 36c of the holding lever 36 to prevent further counterclockwise rotation and the rear blade group (not shown) is kept in the position closing the exposure aperture A (unfoled position). On the other hand, even if said counterclockwise rotation of the front blade actuating arm 12 causes the shaft 12b to be brought into contact with the side surface 32c of the X-contact lever 32 and the X-contact release lever 29 is rotated clockwise by the displacement of the pin 28 due to said slight follow of the rear blade operating lever, the X-contact lever 32 is retained in the position shown in FIG. 1 (state wherein the movable contact 32b is not in contact with the fixed contact 34).

When the main cocking lever 1 reaches the limit clockwise position, or so-called the overtravel position (shown in FIG. 3), the roller 11 gets into contact with the pressed portion 36a of the retaining lever 36 and rotates the retaining lever 36 clockwise, thereby releasing the lock portion 36c from the large-diameter pin 27 of the rear blade operating lever 24. As a result, the rear blade operating lever 24 is rotated counterclockwise under the tension applied by spring 25 while rotating the retaining lever 36 further clockwise, moves the rear blade group (not shown) from the position closing the exposure aperture A to the position to open the exposure aperture A and stops the rear blade operating lever 24 by retaining the small-diameter pin 26 with the operating portion 20a of the rear blade actuating arm 20. Since the holding lever 36 is rotated counterclockwise against the frictional force produced by frictional means 37b and 37c during this operation, the rear blade operating lever 24 rotates counterclockwise at a relatively low speed while the large-diameter pin 27 is released from the locking portion 36c and moves along the cam surface 36d in frictional contact condition, and rotates counterclockwise at a high speed and then stops after the large-diameter pin 27 is released from the cam surface 36d. Therefore, it is possible to limit the bound of the rear blade group at its stop time within a very narrow range by adequately selecting length of the cam surface 36d for restricting returning timing of the rear blade group. On the other hand, the X-contact release lever 29 is rotated clockwise by the displacement of the pin 28 and then is stopped by the stopper pin 35 in a condition where the engaging portion 29 is escaped from the engaging portion 32a of the X-contact lever 32, whereas the mirror returning lever 38 is rotated counterclockwise and stopped by the stopper pin 37, whereby the X-contact lever 29 and the mirror returning lever 38 are set at the positions shown in FIG. 3 respectively.

Figure 4:
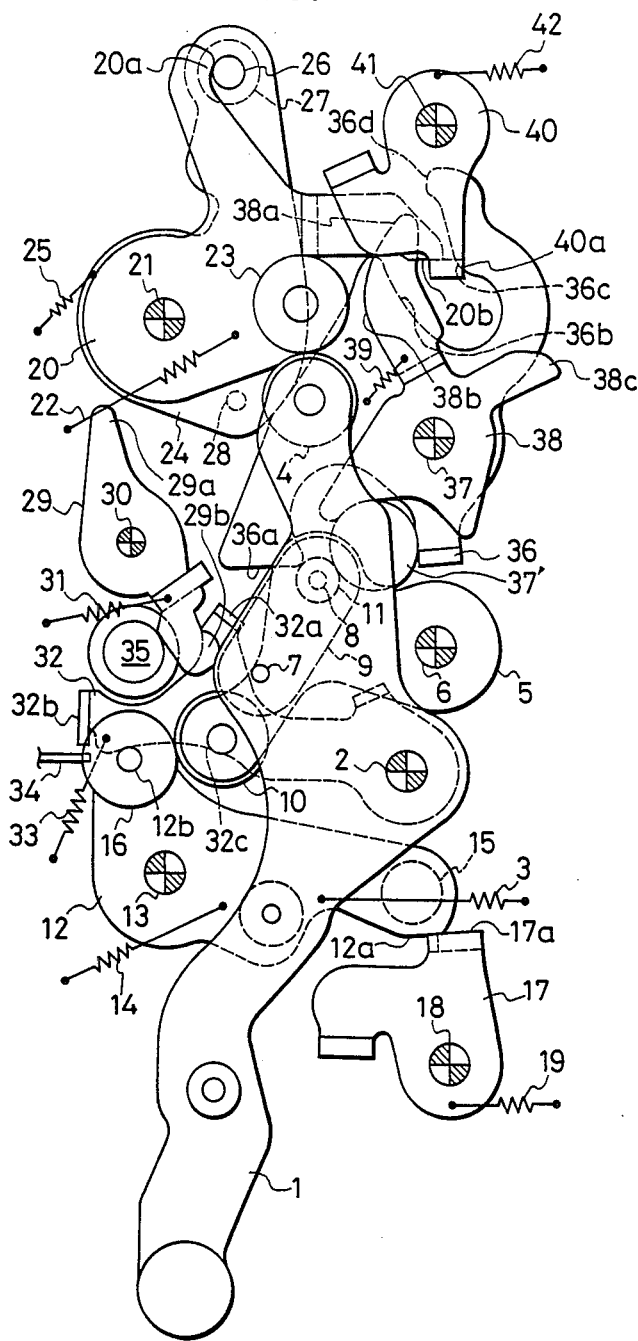
FIG. 4 is a plan view of the main parts illustrating the cocked state of said embodiment.

When the operating force to the main cocking lever is released thereafter, the main cocking lever 1 and the auxiliary cocking lever interlocked therewith are returned by the force of the spring 3 to the original positions shown in FIG. 1, the front blade actuating arm 12 is retained in the cocked state where the locked portion 12a is locked by the front blade locking lever 17 to prevent the clockwise rotation of the front blade actuating arm 12 and the rear blade actuating arm 20 is held also in the cocked state where the locked portion 20b is locked by the rear blade locking lever 40, thereby establishing the cocked state of the focal plane shutter shown in FIG. 4. When the front blade actuating arm 12 and the rear blade actuating arm 20 are unlocked by actuating the front blade locking lever 17 and the rear blade locking lever 40 with an electromagnetic device, etc. at an adequate time interval in the known manner in the state shown in FIG. 4, the front blade actuating arm 12 displaces the front blade group (not shown) from the position closing the exposure aperture A to the open position and the rear blade actuating arm 20 displaces the rear blade group from the position opening the exposure aperture A to the position to close the exposure aperture A by way of the rear blade operating arm 24, thereby completing a single exposure operation and resetting the focal plane shutter in the state illustrated in FIG. 1. During this operation, the X-contact lever 32 is rotated counterclockwise since it is released by the displacement of the shaft 12b and its contact portion 32b is brought into contact with the contact piece 34 for flashing at the moment that the front blade group opens the exposure aperture A.

Thereafter, the rear blade operating lever 24 rotates clockwise, and simultaneously the pin 28 contacts and pushes the engaging portion 29a of the X-contact release lever 29, thereby rotating the X-contact release lever 29 counterclockwise around the shaft 30. The engaging portion 29b contacts the engaging portion 32a of the X-contact lever 32 and pushes the X-contact lever 32 to leave it from the X-contact 34 against the force applied by the spring 33 and hold said lever in the left position.

On the other hand, during the clockwise rotation of the rear blade operating arm, the retaining lever 36 is rotated clockwise to the position shown in FIG. 1 since its side surface 36b is pushed by the large-diameter pin 27, whereas the mirror returning lever 38 is rotated clockwise to the position shown in FIG. 1 since its side surface 38a is pushed by the small-diameter pin 26. As apparent from the above descriptions, the rear blade operating lever 24 is braked at the final stage of its clockwise rotation due to travel along the side surface 36b of the holding lever 36, and the small-diameter pin 26 is kept in the sandwiched condition between the operating portion 20a of the rear blade actuating arm and the side surface 38b of the mirror returning lever 38, whereby bound of the rear blade group is limited within a very narrow range at the final stage of its travel.

What is claimed is:

1. A focal plane shutter comprising a base plate having an exposure aperture, a front blade actuating arm pivoted on said base plate, and movable between the cocked position and the uncocked position, a rear blade actuating arm pivoted on said base plate, and movable between the cocked position and the uncocked position, a cocking means pivoted on said base plate, and capable of bringing said front blade actuating arm and said rear blade actuating arm from the uncocked position to the cocked position respectively, a rear blade operating lever pivoted on said base plate, and following said rear blade actuating arm when said rear blade actuating arm is brought from the uncocked position to the cocked position and moved by said rear blade actuating arm when said rear blade actuating arm is moved from the cocked position to the uncocked position, and a control lever pivoted on said base plate, and moved by said cocking means for locking said rear blade operating lever at a rear blade closing position when an exposure operation has been completed and unlocking said rear blade operating lever when said rear blade actuating arm is brought to the cocked position; said control lever having a brake means for braking said rear blade operating lever when said rear blade operating lever is moved from the locked position to the unlocked position.

2. A focal plane shutter according to claim 1 further comprising a movable contact member pivoted on said base plate and engageable with said fron blade actuating arm for flashing, a movable contact release member pivoted on said base plate, and engageable with said movable contact member and said rear blade operating lever, a fixed contact attached fixedly on said base plate and contactable with said movable contact member for flashing, and a spring connected between said base plate and said movable contact member for elastically pressing said movable contact member to bring it into contact with said fixed contact; said focal plane shutter being adapted in such a manner that said movable contct member is retained at a position apart from said fixed contact by said front blade actuating arm against the force applied by said spring when said front blade actuating arm is set at the cocked position, said movable contact member is brought into contact with said fixed contact by said spring when said front blade actuating arm attains to the uncocked position from the cocked position, said movable contact member is kept apart from said fixed contact against the force applied by said spring said movable contact release member by way of said rear blade operating lever and said movable contact release member is unlocked from said rear blade operating lever so as to be apart from said movable contact member at the latter half stage of the travel of said rear blade actuating arm from the uncocked position to the cocked position.

3. A focal plane shutter according to claim 1 or 2 further comprising a spring member arranged between said base plate and said control lever for imparting frictional resistance to the motion of said control lever.

4. A focal plane shutter according to claim 1 or 2 wherein said rear blade operating lever has a pin studded thereon, and said brake means is a cam formed on said control lever and contactable with said pin.

* * * * *